United States Patent
Frank et al.

(10) Patent No.: US 7,209,451 B2
(45) Date of Patent: Apr. 24, 2007

(54) APPARATUS AND METHOD FOR EFFICIENT DETECTION AND SUPPRESSION OF CORRUPTED FIBRE CHANNEL FRAMES IN A PROTECTED TRANSMISSION MEDIUM

(75) Inventors: Ronald Arthur Frank, Calgary (CA); Stephen Kieran Anthony Adolph, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 953 days.

(21) Appl. No.: 10/047,474

(22) Filed: Oct. 23, 2001

(65) Prior Publication Data

US 2003/0076779 A1 Apr. 24, 2003

(51) Int. Cl.
*G01R 31/08* (2006.01)

(52) U.S. Cl. ...................... 370/241; 370/229; 370/242; 370/503

(58) Field of Classification Search ............... 370/241, 370/242, 245, 250, 503, 509, 514, 522
See application file for complete search history.

(56) References Cited

U.S. PATENT DOCUMENTS

| | | | | |
|---|---|---|---|---|
| 5,610,745 A | * | 3/1997 | Bennett | 398/52 |
| 6,167,026 A | * | 12/2000 | Brewer et al. | 370/222 |
| 6,226,269 B1 | * | 5/2001 | Brewer et al. | 370/245 |
| 6,226,299 B1 | * | 5/2001 | Henson | 370/420 |

* cited by examiner

*Primary Examiner*—Wing Chan
*Assistant Examiner*—Andrew C. Lee
(74) *Attorney, Agent, or Firm*—Clements Walker; Christopher L. Bernard; Tyler S. Brown

(57) ABSTRACT

An apparatus and method for detecting and suppressing corrupted data frames transported from a SONET network to a receiver utilizing the SOF frame indicator to manage the buffer-to-buffer credit count. By verifying the integrity of the SOF frame indicator prior to forwarding it to the client receiver the apparatus and method ensure that the buffer-to-buffer credit count integrity is maintained while avoiding the introduction of latency.

4 Claims, 1 Drawing Sheet

Figure 2

APPARATUS AND METHOD FOR EFFICIENT DETECTION AND SUPPRESSION OF CORRUPTED FIBRE CHANNEL FRAMES IN A PROTECTED TRANSMISSION MEDIUM

FIELD OF THE INVENTION

This invention relates to a method and apparatus for detecting and suppressing fibre channel (FC) frames which have been corrupted within a protected communications medium such as a protected SONET (synchronous optical network) transmission system.

BACKGROUND OF THE INVENTION

Most SONET transmission systems use some form of line-level protection facility (such as those known as "1+1", "1:1", "1:n") in order to provide a high degree of reliability for data transport. These protection facilities provide a level of certainty that data transport will continue in the event of a line failure, but the known facilities are not able to prevent temporary interruptions of service.

SONET systems typically monitor the working line and, if and when a certain number of data frame defects are detected within a predetermined amount of time, the system switches over to another transmission line which is referred to as a protection line. Normally it takes in the order of tens of milliseconds from the point in time that the first defect is detected to the point at which data traffic on the protection line is restored. At the gigabit data transmission speeds of fibre channel (FC) links such a switching time period may represent in the order of several thousands of data frames. During this period corrupted data frames may be transported to the fibre channel client receiver and this may cause performance degradation or link failure due to fact that the receiving equipment may incorrectly account for corrupted frames and cause the buffer-to-buffer credit count between the sending and receiving equipment to become incoherent.

One method of addressing this problem is to buffer the received data frame as it is de-encapsulated, since most encapsulation protocols have a CRC or checksum field which can be used to validate frame integrity, discarding those frames detected as corrupt. However, this method presents disadvantages in that it causes the frame to incur latency and requires buffering a frame of up to 2200 bytes.

There is a need, therefore, for means to enable an efficient detection and handling of corrupted frames prior to the transmission thereof over a protected line to a client receiver.

SUMMARY OF THE INVENTION

Advantageously, the invention provides means for verifying the integrity of an SOF frame indicator prior to forwarding it to an FC client receiver to ensure that the buffer-to-buffer credit count integrity is maintained (and, thus, to prevent degradation or link failure of FC services) while avoiding the introduction of latency.

In accordance with the invention there is provided an apparatus for detecting and suppressing corrupted data frames transported from a SONET network to a receiver utilizing buffer-to-buffer credit counting means to control the flow of data frames thereto (an fibre channel link receiver). A frame de-encapsulation component is configured for producing and outputting data frames compatible with the receiver from SONET frames input thereto. An idle frame signal generator is configured for generating idle frame signals. A Start of Frame (SOF) indicator detector is configured for detecting a Start of Frame indicator in each receiver-compatible data frame output from the frame de-encapsulation component and determining whether the Start of Frame indicator is valid or corrupted. The detector produces an output signal indicative of the determination. A multiplexer is configured for selecting for output to the receiver one of a first and second signal input thereto on the basis of the output signal produced by the Start of Frame (SOF) indicator detector, the first input signal being a current receiver-compatible data frame and the second input signal being the idle frame signal, wherein the first input signal is selected when the output signal produced by the Start of Frame (SOF) indicator detector indicates that the Start of Frame indicator is valid and the second input signal is selected when the output signal produced by the Start of Frame (SOF) indicator detector indicates that the Start of Frame indicator is corrupted.

In accordance with a further aspect of the invention there is provided a method for detecting and suppressing corrupted data frames transported from a SONET network to a receiver utilizing the SOF frame indicator to manage the buffer-to-buffer credit count. SONET frames are received from the SONET network and data frames compatible with the receiver are produced from the received SONET frames. A Start of Frame indicator is detected in each data frame and a determination is made whether the Start of Frame indicator is valid or corrupted. A current data frame is selected for output to the receiver when the Start of Frame indicator is valid and an idle frame signal is selected for output to the receiver when the Start of Frame indicator is corrupted.

BRIEF DESCRIPTION OF THE DRAWINGS

The invention will now be described in detail with reference to the following drawings in which like reference numerals refer to like elements throughout.

DETAILED DESCRIPTION OF THE ILLUSTRATED PREFERRED EMBODIMENT

Figure 1:
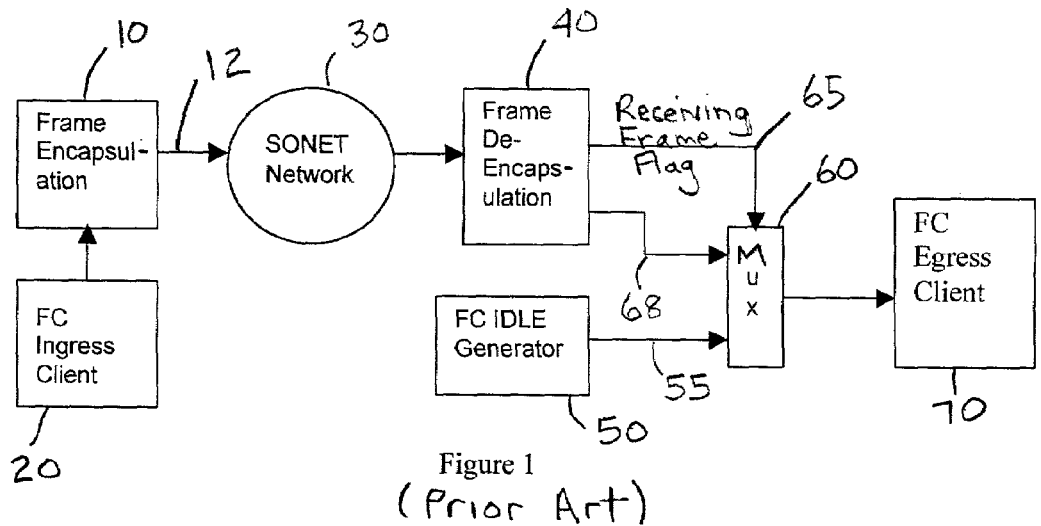
FIG. 1 is a schematic block diagram showing a prior art FC (Fibre Channel)-to-SONET system in which data is transported directly from a frame de-encapsulation component to a multiplexer for transport to a Fibre Channel (FC) link; and, FIG. 2 is a schematic block diagram showing an FC (Fibre Channel)-to-SONET system comprising a corrupt frame detection apparatus in accordance with the invention for detecting and suppressing a corrupted frame output by a de-encapsulation component.

In the prior art FC (Fibre Channel)-to-SONET data transmission system illustrated by FIG. 1, fibre channel (FC) data frames received from an FC client transmitter 20 are input to a frame encapsulation component 10 which encapsulates (in a protocol such as HDLC) and formats them into SONET frames and the generated SONET data frames 12 are transported over a SONET network 30. The encapsulation protocol places its own idle code signal on the SONET line when there is no frame to send (whereby the fibre channel idle code is terminated at the point of encapsulation, as opposed to being sent through the system). At the other end of the SONET network 30 a frame de-encapsulation component 40 reformats the data to FC formatted data 68 and also generates a "receiving frame" flag 65 which identifies whether a frame is being received. Each of the data and "receiving frame" signals 68,65 and an idle code signal 55 generated by an FC IDLE generator 50 are input to a multiplexer 60. The multiplexer 60 selects between the data 68 and idle code signal 55, depending upon the status of the "receiving frame" flag 65. If a receiving frame is flagged to be present it is then transported to an FC client receiver 70 without regard to whether or not the SOF (Start of Frame) may be corrupted. This undesirable aspect of the prior systems is avoided by the improved system provided by the present invention, a preferred embodiment of which is illustrated by FIG. 2.

Although many encapsulation protocols provide a CRC or checksum field from which it can be determined whether the frame has been corrupted, the frame would have to be buffered at some point until the CRC or checksum could be validated. As stated above, this approach is undesirable as it would introduce latency into the frame and would require additional hardware.

Figure 2:
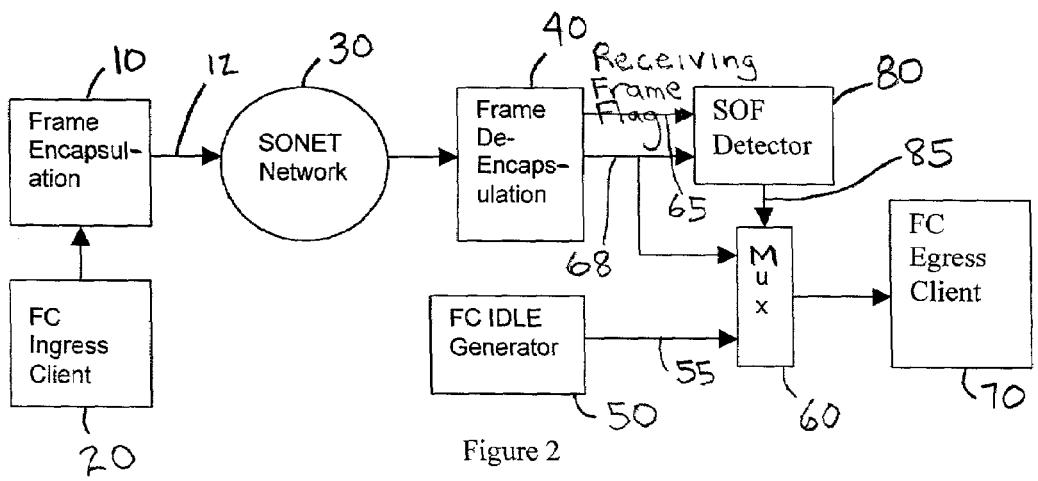

A preferred embodiment of the invention, which avoids the use of buffering and the resultant latency, is illustrated by FIG. 2. The method and apparatus of the invention utilizes a Start of Frame (SOF) Detector component 80 which determines whether or not the Start of Frame (SOF) indicator of the current frame has been corrupted. If the Start of Frame (SOF) Detector component 80 determines that the SOF indicator is valid, then the SOF Detector output signal 85 causes the multiplexer 60 to transmit the data frame 68 to the FC client receiver 70. However, if the Start of Frame (SOF) Detector component 80 determines that the frame SOF indicator has been corrupted, the remainder of the frame is ignored and transmission of that corrupted frame is suppressed. In this event, the SOF Detector output signal 85 causes the multiplexer 60 to instead transmit the idle code signal 55 to the FC client receiver 70.

Since Fibre Channel uses the SOF frame indicator to manage the buffer-to-buffer credit count, verifying its integrity prior to forwarding it to the client receiver ensures that the buffer-to-buffer credit count integrity is maintained while avoiding the introduction of latency. It is to be understood that it is the maintenance of the buffer-to-buffer count integrity to which the invention is directed and not the remainder of the frame which, if corrupted, will be detected by the CRC.

Advantageously, the foregoing method and apparatus of the invention assists in the prevention of performance degradation or link failure of Fibre Channel services as a result of frames being corrupted during a protection switch and it does so without introducing any buffering, which introduces additional hardware and latency.

The individual electronic and optical components and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventors which is defined by the appended claims.

What is claimed is:

1. An apparatus for detecting and suppressing corrupted data frames transported from a SONET network to a receiver, said apparatus comprising:
   a buffer-to-buffer credit counting means to control the flow of data frames, wherein said buffer-to-buffer credit counting means comprises:
   (a) a frame de-encapsulation component configured for producing data frames compatible with said receiver from SONET frames input thereto, and outputting said receiver-compatible data frames;
   (b) an idle frame signal generator configured for generating idle frame signals;
   (c) a Start of Frame (SOF) indicator detector configured for detecting a Start of Frame indicator in each said receiver-compatible data frame output from said frame de-encapsulation component and determining whether said Start of Frame indicator is valid or corrupted, wherein said detector produces an output signal indicative of said determination; and
   (d) a multiplexer configured for selecting for output to said receiver one of a first and a second signal input thereto on the basis of said output signal produced by said Start of Frame (SOF) indicator detector wherein said first input signal is a current said receiver-compatible data frame and said second input signal is said idle frame signal, said first input signal being selected when said output signal produced by said Start of Frame (SOF) indicator detector indicates that said Start of Frame indicator is valid and said second input signal being selected when said output signal produced by said Start of Frame (SOF) indicator detector indicates that said Start of Frame indicator is corrupted;
   wherein said apparatus verifies said Start of Frame indicator in each of said receiver-compatible data frames and suppresses a receiver-compatible data frame responsive to corruption in said Start of Frame indicator prior to forwarding to said receiver to ensure buffer-to-buffer credit count integrity is maintained; and
   wherein the integrity of the remainder of said receiver-compatible data frame is verified by the receiver.

2. An apparatus according to claim 1 wherein said receiver is for a fibre channel (FC) link.

3. A method for detecting and suppressing corrupted data frames transported from a SONET network to a receiver, said method comprising:
   (a) receiving SONET frames from said SONET network and producing data frames compatible with said receiving from said received SONET frames;
   (b) detecting a Start of Frame indicator in each said receiver-compatible data frame and determining whether said Start of Frame indicator is valid or corrupted; and
   (c) selecting for output to said receiver a current said receiver-compatible data frame when said Start of Frame indicator is valid and selecting for output to said receiver said idle frame signal when said Start of Frame indicator is corrupted;
   wherein said method utilizes a buffer-to-buffer credit counting means to control the flow of data frames;
   wherein said method verifies said Start of Frame indicator in each of said receiver-compatible data frames and suppresses a receiver-compatible data frame responsive to corruption in said Start of Frame indicator prior to forwarding to said receiver to ensure buffer-to-buffer credit count integrity is maintained; and
   wherein the integrity of the remainder of said receiver-compatible data frame is verified by the receiver.

4. A method according to claim 3 whereby said receiver is for a fibre channel (FC) link.

* * * * *